United States Patent [19]
Nommensen

[11] Patent Number: 5,865,279
[45] Date of Patent: Feb. 2, 1999

[54] HYDRAULIC BRAKE APPARATUS HAVING PLURAL MASTER CYLINDERS

[75] Inventor: Daniel Nommensen, Monroe, Wis.

[73] Assignee: Monroe Truck Equipment Inc., Monroe, Wis.

[21] Appl. No.: 782,959

[22] Filed: Jan. 13, 1997

[51] Int. Cl.$^6$ .................................................... B60T 7/02
[52] U.S. Cl. ...................... 188/345; 188/3 H; 303/9.61
[58] Field of Search .......................... 303/9.61; 188/345, 188/354, 358, 3 H

[56] References Cited

U.S. PATENT DOCUMENTS

| | | | |
|---|---|---|---|
| 3,834,769 | 9/1974 | Just ........................................ | 188/345 |
| 4,505,519 | 3/1985 | Muterel .................................. | 188/354 |
| 4,598,954 | 7/1986 | Hayashi ................................. | 188/345 |
| 5,031,729 | 7/1991 | Wittkop et al. ........................ | 188/3 H |

*Primary Examiner*—Matthew C. Graham
*Attorney, Agent, or Firm*—David J. Archer

[57] ABSTRACT

A hydraulic brake apparatus is disclosed for braking a vehicle. The apparatus includes a reservoir for the reception therein of hydraulic fluid and a master cylinder hydraulically connected to the reservoir. A pedal actuator is pivotally secured to the vehicle and operably connected to the master cylinder. The arrangement is such that when the pedal actuator is pivoted from a retracted first location to a depressed second location thereof, hydraulic fluid is drawn by the master cylinder from the reservoir towards the master cylinder. A slave cylinder is hydraulically connected to the master cylinder such that when the pedal actuator moves from the retracted first location to the depressed second location, hydraulic fluid is pumped from the master cylinder towards the slave cylinder for actuation thereof. A further pedal actuator is pivotally secured to the vehicle and operably connected to the slave cylinder, the arrangement being such that upon the actuation of the slave cylinder, the further pedal actuator is pivoted from a released first location to an applied second location thereof. A further master cylinder is hydraulically connected to the reservoir and operably connected to the further pedal actuator. A brake system is hydraulically connected to the further master cylinder such that when the further pedal actuator is pivoted towards the applied second location, the further master cylinder pumps hydraulic fluid from the further master cylinder towards the brake system so that the brake system is applied for braking the vehicle. The arrangement is such that braking of the vehicle is accomplished by movement of at least one of the pedals towards the respective second location.

11 Claims, 2 Drawing Sheets

HYDRAULIC BRAKE APPARATUS HAVING PLURAL MASTER CYLINDERS

BACKGROUND OF THE INVENTION

1. Field of the Invention

The present invention relates to a hydraulic brake apparatus for braking a vehicle. More specifically, the present invention relates to a hydraulic brake apparatus for braking a vehicle having dual braking controls.

2. Information Disclosure Statement

Typically, truck chassis are either steered from the left hand side or the right hand side. In the United States, trucks are arranged for steering from the left side whereas in countries such as England, steering is from the right side.

Additionally, there are some applications where steering is required from both sides such as driver education vehicles, garbage trucks and street sweepers. The present invention relates to the aforementioned dual steer chassis. More specifically, the present invention relates to the application of the brakes from the right side of the chassis which normally has left hand steer.

Although many manufacturers have over the years built dual steer chassis with air brakes, the air brakes are controlled with a combination of air valves which allow control from either side. However, this system is not possible on trucks with hydraulic brakes.

More specifically, in the past, manufacturers have used a combination of cables and mechanical linkages to link the right side pedal to the left side pedal. Therefore, when the operator pushed the pedal on the right, the cables and linkage would push the pedal on the left.

Although the aforementioned cable and linkage system has worked relatively well on driver education vehicles, such is not the case with stand up right hand steer equipment. With stand up steer machines, the linkage and cabling becomes quite complicated and less effective. For this reason, at least one manufacturer refuses to convert stand up right hand steer vehicles with hydraulic brakes.

The present invention overcomes the aforementioned problem by the provision of apparatus in which pushing on the right side pedal actuator causes a slave cylinder to stroke the left side brake pedal which results in the brakes being applied.

Return springs built into the pedal actuators and slave cylinder return these assemblies to the non-brake applied position when the operator at the right side removes pressure from the brake pedal.

When driven from the left side, the driver can apply the brakes as normal. The slave cylinder, according to the present invention will stroke unnoticed with the left side pedal as the left side driver applies and releases the brake pedal.

Accordingly, the present invention overcomes the problems associated with the prior art arrangements and makes a considerable contribution to the art of hydraulic braking systems.

Therefore, the primary objective of the present invention is the elimination of the need for cables and linkages.

Other objects and advantages of the present invention will be readily apparent to those skilled in the art by careful consideration of the detailed description of a preferred embodiment of the present invention as described hereinafter.

SUMMARY OF THE INVENTION

The present invention relates to a hydraulic brake apparatus for braking a vehicle. The apparatus includes a reservoir for the reception therein of hydraulic fluid and a master cylinder hydraulically connected to the reservoir. A pedal actuator is pivotally secured to the vehicle and operably connected to the master cylinder. The arrangement is such that when the pedal actuator is pivoted from a retracted first location to a depressed second location thereof, hydraulic fluid is drawn by the master cylinder from the reservoir towards the master cylinder. A slave cylinder is hydraulically connected to the master cylinder such that when the pedal actuator moves from the retracted first location to the depressed second location, hydraulic fluid is pumped from the master cylinder towards the slave cylinder for actuation thereof. A further pedal actuator is pivotally secured to the vehicle and operably connected to the slave cylinder. The arrangement is such that upon the actuation of the slave cylinder, the further pedal actuator is pivoted from a released first location to an applied second location thereof. A further master cylinder is hydraulically connected to the reservoir and operably connected to the further pedal actuator. A brake system is hydraulically connected to the further master cylinder such that when the further pedal actuator is pivoted towards the applied second location, the further master cylinder pumps hydraulic fluid from the further master cylinder towards the brake system so that the brake system is applied for braking the vehicle. The arrangement is such that braking of the vehicle is achieved by movement of at least one of the pedals towards the respective second location.

In a more specific embodiment of the present invention, the reservoir includes a first hydraulic line from the reservoir to the master cylinder and a second hydraulic line from the reservoir to the slave cylinder. A third hydraulic line extends from the reservoir to the further master cylinder.

Also, the master cylinder is rigidly secured to the vehicle, the master cylinder defining a longitudinal bore. A piston having a first and a second end is slidably disposed within the bore. Additionally, the master cylinder includes an actuating arm having a first and a second end. The first end of the actuating arm cooperates with the second end of the piston and the second end is pivotally secured to the pedal actuator about a first pivotal axis. Biasing means urges the piston towards the pedal actuator.

The pedal actuator has a first and a second end, the first end defining a foot engaging pad. The second end of the pedal actuator is pivotally secured to the vehicle about a second pivotal axis. The first pivotal axis is disposed between the pad and the second pivotal axis.

The slave cylinder defines an elongate channel. A sealed piston having a first and a second end is slidably disposed within the channel. The slave cylinder also includes a rod having a first and a second end, the first end being rigidly secured to the second end of the sealed piston. The second end of the rod is pivotally secured to the further pedal actuator about a third pivotal axis.

The further pedal actuator has a first and a second extremity, the first extremity defining a further foot engaging pad. The second extremity of the further pedal actuator is pivotally secured to the vehicle about a fourth pivotal axis, the third pivotal axis being disposed between the further pad and the fourth pivotal axis.

The further master cylinder is rigidly secured to the vehicle and defines a further longitudinal bore.

Additionally, the further master cylinder includes a further piston having a first and a second end. The further piston is slidably disposed within the further bore. A further actuating arm has a first and a second end, the first end cooperating with the second end of the further piston while the second end is pivotally secured to the further pedal actuator about a fifth pivotal axis. A further biasing means urges the further piston towards the further pedal actuator.

The third pivotal axis is disposed between the fifth pivotal axis and the further pad.

In a preferred embodiment of the present invention, the brake means is a hydraulically actuated braking system.

Many modifications and variations of the present invention will be readily apparent to those skilled in the art by a consideration of the detailed description contained hereinafter taken in conjunction with the annexed drawings. However, such variations and modifications fall within the spirit and scope of the present invention as defined by the appended claims.

BRIEF DESCRIPTION OF THE DRAWINGS

Similar reference characters refer to the same parts in the two views of the drawings.

DETAILED DESCRIPTION OF THE DRAWINGS

Figure 1:
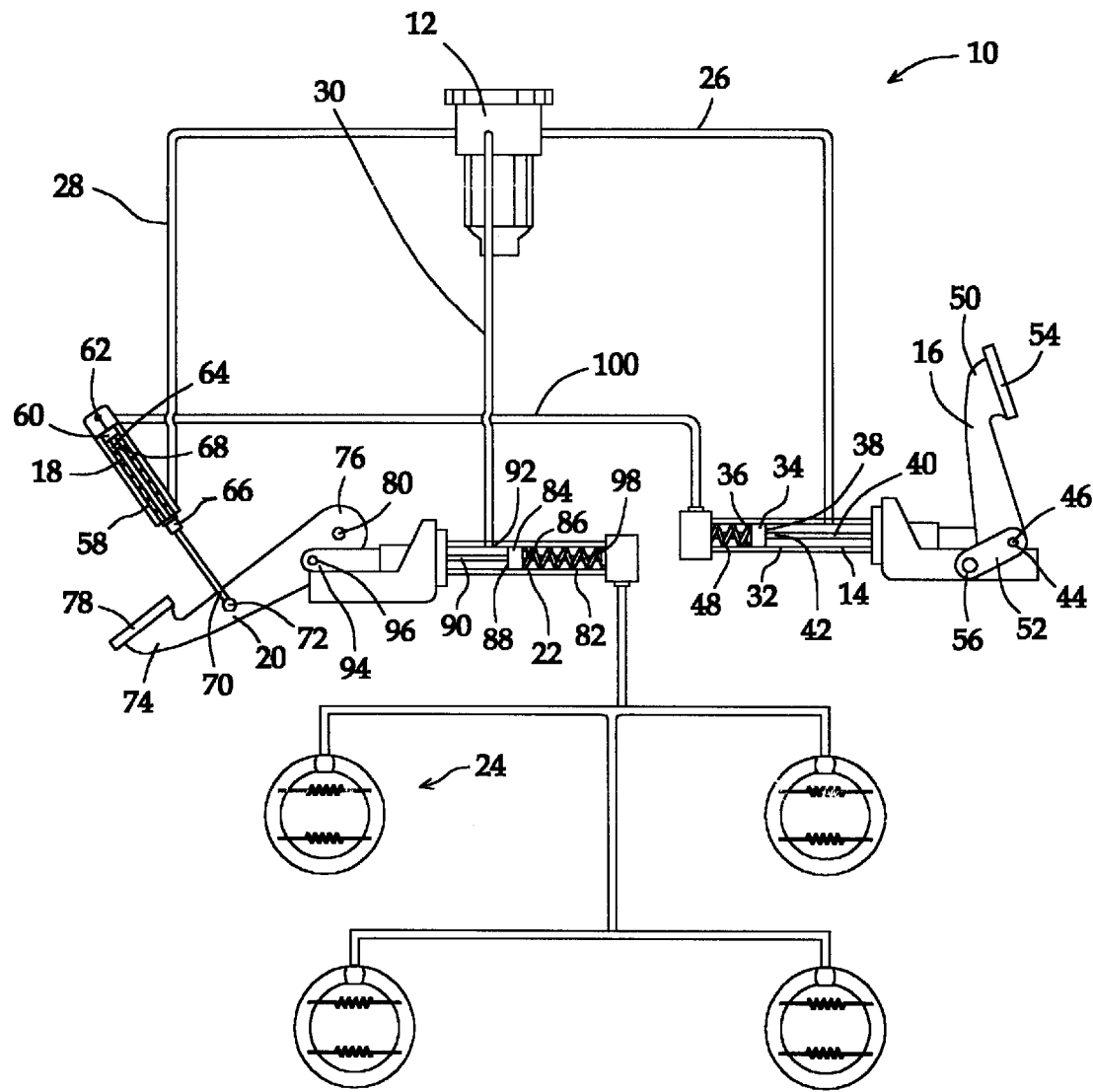
FIG. 1 of the drawings shows a diagrammatic representation of a hydraulic brake apparatus for braking a vehicle according to the present invention with the pedals in the retracted and released location.
Figure 2:
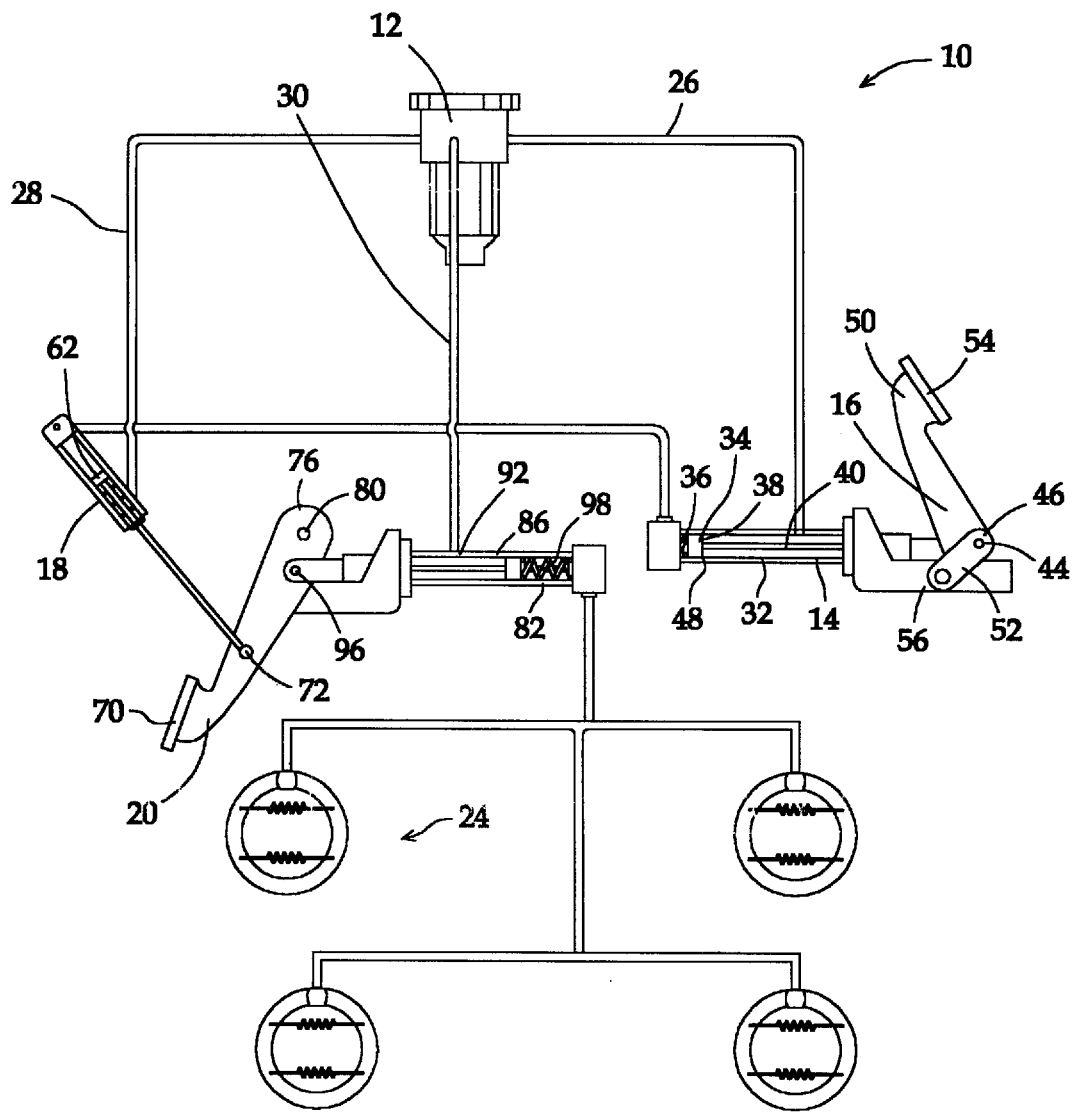
FIG. 2 is a similar view to that shown in FIG. 1 but shows the pedals in the depressed and applied locations.

FIG. 1 of the drawings is a diagrammatic representation of a hydraulic brake apparatus generally designated 10 according to the present invention for braking a vehicle The apparatus 10 includes a reservoir 12 for the reception therein of hydraulic fluid and a master cylinder 14 hydraulically connected to the reservoir 12. A pedal actuator 16 is pivotally secured to the vehicle and operably connected to the master cylinder 14. The arrangement is such that when the pedal actuator 16 is pivoted from a retracted first location as shown in FIG. 1 to a depressed second location thereof as shown in FIG. 2, hydraulic fluid is drawn by the master cylinder 14 from the reservoir 12 towards the master cylinder 14. A slave cylinder 18 is hydraulically connected to the master cylinder 14 such that when the pedal actuator 16 moves from the retracted first location to the depressed second location, hydraulic fluid is pumped from the master cylinder 14 towards the slave cylinder 18 for actuation thereof. A further pedal actuator 20 is pivotally secured to the vehicle and operably connected to the slave cylinder 18, the arrangement being such that upon the actuation of the slave cylinder 18, the further pedal actuator 20 is pivoted from a released first location to an applied second location thereof as shown in FIG. 2. A further master cylinder 22 is hydraulically connected to the reservoir 12 and operably connected to the further pedal actuator 20. A brake system generally designated 24 is hydraulically connected to the further master cylinder 22 such that when the further pedal actuator 20 is pivoted towards the applied second location, the further master cylinder 22 pumps hydraulic fluid from the further master cylinder 22 towards the brake system 24 so that the brake system is applied for braking the vehicle. The arrangement is such that braking of the vehicle is accomplished by movement of at least one of the pedals 16 or 20 towards the respective second location.

The reservoir

In a more specific embodiment of the present invention, the reservoir 12 includes a first hydraulic line 26 from the reservoir 12 to the master cylinder 14 and a second hydraulic line 28 from the reservoir 12 to the slave cylinder 18. A third hydraulic line 30 extends from the reservoir 12 to the further master cylinder 22.

Master cylinder

Also, the master cylinder 14 is rigidly secured to the vehicle, the master cylinder 14 defining a longitudinal bore 32 and a piston 34 having a first and a second end 36 and 38 respectively. The piston 34 is slidably disposed within the bore 32. Additionally, the master cylinder 14 includes an actuating arm 40 having a first and a second end 42 and 44 respectively. The first end 42 cooperates with the second end 38 of the piston 34 and the second end 44 is pivotally secured to the pedal actuator 16 about a first pivotal axis 46. Biasing means 48 such as a compression spring urges the piston 34 towards the pedal actuator 16.

Pedal actuator

The pedal actuator 16 has a first and a second end 50 and 52 respectively, the first end 50 defining a foot engaging pad 54. The second end 52 of the pedal actuator 16 is pivotally secured to the vehicle about a second pivotal axis 56, the first pivotal axis 46 being disposed between the pad 54 and the second pivotal axis 56.

Slave cylinder

The slave cylinder 18 defines an elongate channel 58. A sealed piston 60 having a first and a second end 62 and 64 respectively is slidably disposed within the channel 58. The slave cylinder 18 also includes a rod 66 having a first and a second end 68 and 70 respectively. The first end 68 is rigidly secured to the second end 64 of the sealed piston 60, the second end 70 of the rod 66 being pivotally secured to the further pedal actuator 20 about a third pivotal axis 72.

Further pedal actuator

The further pedal actuator 20 has a first and a second extremity 74 and 76 respectively. The first extremity 74 defines a further foot engaging pad 78. The second extremity 76 of the further pedal actuator 20 is pivotally secured to the vehicle about a fourth pivotal axis 80, the third pivotal axis 72 being disposed between the further pad 78 and the fourth pivotal axis 80.

Further master cylinder

The further master cylinder 22 is rigidly secured to the vehicle and defines a further longitudinal bore 82.

A further piston 84 has a first and a second end 86 and 88 respectively. The further piston 84 is slidably disposed within the further bore 82. A further actuating arm 90 has a first and a second end 92 and 94 respectively and the first end 92 cooperates with the second end 88 of the further piston 84. The second end 94 is pivotally secured to the further pedal actuator 20 about a fifth pivotal axis 96. A further biasing means such as a compression spring 98 urges the further piston 84 towards the further pedal actuator 20.

In a preferred embodiment of the present invention, the brake means or brake system 24 is a hydraulically actuated braking system.

Also, the brake apparatus further includes a hydraulic line 100 extending from the master cylinder 14 to the slave cylinder 18.

In operation of the apparatus according to the present invention, when driven from the left side, the driver can apply the brakes as normal. The slave cylinder, according to the present invention will stroke unnoticed with the left side pedal as the left side driver applies and releases the brake pedal.

What is claimed is:

1. A hydraulic brake apparatus for braking a vehicle, said apparatus comprising:

a reservoir for the reception therein of hydraulic fluid;

a master cylinder hydraulically connected to said reservoir;

a pedal actuator pivotally secured to the vehicle and operably connected to said master cylinder, the arrangement being such that when said pedal actuator is pivoted from a retracted first location to a depressed second location thereof, hydraulic fluid is drawn by said master cylinder from said reservoir towards said master cylinder;

a slave cylinder hydraulically connected to said master cylinder such that when said pedal actuator moves from said retracted first location to said depressed second location, hydraulic fluid is pumped from said master cylinder towards said slave cylinder for actuation thereof;

a further pedal actuator pivotally secured to the vehicle and operably connected to said slave cylinder, the arrangement being such that upon said actuation of said slave cylinder, said further pedal actuator is pivoted from a released first location to an applied second location thereof;

a further master cylinder hydraulically connected to said reservoir and operably connected to said further pedal actuator; and brake means hydraulically connected to said further master cylinder such that when said further pedal actuator is pivoted towards said applied second location, said further master cylinder pumps hydraulic fluid from said further master cylinder towards said brake means so that said brake means are applied for braking the vehicle, the arrangement being such that braking of the vehicle is accomplished by movement of at least one of said pedals towards said respective second location.

2. A hydraulic brake apparatus as set forth in claim 1 wherein said reservoir includes:
a first hydraulic line from said reservoir to said master cylinder;
a second hydraulic line from said reservoir to said slave cylinder;
a third hydraulic line from said reservoir to said further master cylinder.

3. A hydraulic brake apparatus as set forth in claim 1 wherein said master cylinder is rigidly secured to the vehicle, said master cylinder defining a longitudinal bore;
a piston having a first and a second end, said piston being slidably disposed within said bore;
an actuating arm having a first and a second end, said first end cooperating with said second end of said piston, said second end being pivotally secured to said pedal actuator about a first pivotal axis;
biasing means for biasing said piston towards said pedal actuator.

4. A hydraulic brake apparatus as set forth in claim 3 wherein said pedal actuator has a first and a second end, said first end defining a foot engaging pad,
said second end of said pedal actuator being pivotally secured to the vehicle about a second
pivotal axis, said first pivotal axis being disposed between said pad and said second pivotal axis.

5. A hydraulic brake apparatus as set forth in claim 1 wherein said slave cylinder defines an elongate channel;

a sealed piston having a first and a second end, said sealed piston being slidably disposed within said channel;
a rod having a first and a second end, said first end being rigidly secured to said second end of said sealed piston, said second end of said rod being pivotally secured to said further pedal actuator about a third pivotal axis.

6. A hydraulic brake apparatus as set forth in claim 5 wherein said further pedal actuator has a first and a second extremity, said first extremity defining a further foot engaging pad, said second extremity of said further pedal actuator being pivotally secured to the vehicle about a fourth pivotal axis, said third pivotal axis being disposed between said further pad and said fourth pivotal axis.

7. A hydraulic brake apparatus as set forth in claim 1 wherein said further master cylinder is rigidly secured to the vehicle, said further master cylinder defining a further longitudinal bore;
a further piston having a first and a second end, said further piston being slidably disposed within said further bore;
a further actuating arm having a first and a second end, said first end cooperating with said second end of said further piston, said second end being pivotally secured to said further pedal actuator about a fifth pivotal axis;
further biasing means for biasing said further piston towards said further pedal actuator.

8. A hydraulic brake apparatus as set forth in claim 6 wherein said further master cylinder is rigidly secured to the vehicle, said further master cylinder defining a further longitudinal bore;
a further piston having a first and a second end, said further piston being slidably disposed within said further bore;
a further actuating arm having a first and a second end, said first end cooperating with said second end of said further piston, said second end being pivotally secured to said further pedal actuator about a fifth pivotal axis;
further biasing means for biasing said further piston towards said further pedal actuator;
said third pivotal axis being disposed between said fifth pivotal axis and said further pad.

9. A hydraulic brake apparatus as set forth in claim 1 wherein said brake means is a hydraulically actuated braking system.

10. A hydraulic brake apparatus for braking a vehicle, said apparatus comprising:

a reservoir for the reception therein of hydraulic fluid;
a master cylinder hydraulically connected to said reservoir;
a pedal actuator pivotally secured to the vehicle and operably connected to said master cylinder, the arrangement being such that when said pedal actuator is pivoted from a retracted first location to a depressed second location thereof, hydraulic fluid is drawn by said master cylinder from said reservoir towards said master cylinder;
a slave cylinder hydraulically connected to said master cylinder such that when said pedal actuator moves from said retracted first location to said depressed second location, hydraulic fluid is pumped from said master cylinder towards said slave cylinder for actuation thereof;

a further pedal actuator pivotally secured to the vehicle and operably connected to said slave cylinder, the arrangement being such that upon said actuation of said slave cylinder, said further pedal actuator is pivoted from a released first location to an applied second location thereof;

a further master cylinder hydraulically connected to said reservoir and operably connected to said further pedal actuator;

brake means hydraulically connected to said further master cylinder such that when said further pedal actuator is pivoted towards said applied second location, said further master cylinder pumps hydraulic fluid from said further master cylinder towards said brake means so that said brake means are applied for braking the vehicle, the arrangement being such that braking of the vehicle is accomplished by movement of at least one of said pedals towards said respective second location; and said brake apparatus further including:
a hydraulic line extending from said master cylinder to said slave cylinder.

11. A hydraulic brake apparatus for braking a vehicle, said apparatus comprising:

a reservoir for the reception therein of hydraulic fluid;

a master cylinder hydraulically connected to said reservoir;

a pedal actuator pivotally secured to the vehicle and operably connected to said master cylinder, the arrangement being such that when said pedal actuator is pivoted from a retracted first location to a depressed second location thereof, hydraulic fluid is drawn by said master cylinder from said reservoir towards said master cylinder;

a slave cylinder hydraulically connected to said master cylinder such that when said pedal actuator moves from said retracted first location to said depressed second location, hydraulic fluid is pumped from said master cylinder towards said slave cylinder for actuation thereof;

a further pedal actuator having a first and a second extremity, said further pedal actuator being pivotally secured to the vehicle and operably connected to said slave cylinder, the arrangement being such that upon said actuation of said slave cylinder, said further pedal actuator is pivoted from a released first location to an applied second location thereof;

a further master cylinder hydraulically connected to said reservoir and operably connected to said further pedal actuator between said second extremity and said slave cylinder; and brake means hydraulically connected to said further master cylinder such that when said further pedal actuator is pivoted towards said applied second location, said further master cylinder pumps hydraulic fluid from said further master cylinder towards said brake means so that said brake means are applied for braking the vehicle, the arrangement being such that braking of the vehicle is accomplished by movement of at least one of said pedals towards said respective second location.

* * * * *